United States Patent [19]
Cencik

[11] Patent Number: 5,933,638
[45] Date of Patent: Aug. 3, 1999

[54] METHOD AND APPARATUS FOR CREATING APPLICATION COMPUTER PROGRAMS USING AN OBJECTS EVALUATION MATRIX

[76] Inventor: Peter Cencik, 2409-11 E. Jolly Rd., Lansing, Mich. 48910

[21] Appl. No.: 08/628,134

[22] Filed: Apr. 4, 1996

[51] Int. Cl.[6] .............................. G06F 9/44; G06F 17/00
[52] U.S. Cl. ......................... 395/704; 395/500; 395/672; 707/504
[58] Field of Search .................................... 395/500, 677, 395/670, 672, 680, 683, 704; 707/100, 103, 503, 504

[56] References Cited

U.S. PATENT DOCUMENTS

| | | | |
|---|---|---|---|
| 5,510,980 | 4/1996 | Peters ....................................... | 707/503 |
| 5,598,519 | 1/1997 | Narayanan ............................... | 707/504 |
| 5,623,282 | 4/1997 | Graham et al. .......................... | 345/121 |
| 5,685,001 | 11/1997 | Capson et al. .......................... | 707/503 |

OTHER PUBLICATIONS

"Paradym–31™ Industrial Control Software," 1995, Wizdom Controls, Inc., Naperville, Illinois 60563.

*Primary Examiner*—James P. Trammell
*Assistant Examiner*—Demetra R. Smith
*Attorney, Agent, or Firm*—Frost & Jacobs LLP

[57] ABSTRACT

An Objects Evaluation Matrix™ is provided which links together "objects" (i.e., areas in computer memory that serve as basic structural units of analysis) to create a complete (or partial) application program. A person can use a computer to graphically place objects into the Object Evaluation Matrix with automatic, semi-automatic, or manual connections among objects. It combines worksheet techniques with object programming techniques and with process control techniques, and creates the links between objects, object properties, and cell properties and presents all pertinent information in a special graphical representation. The main benefit is that very sophisticated process control applications can be created utilizing "drag and drop" techniques which use predefined or custom objects (typically Dynamically Linked Libraries) without any need for recompiling and/or coding. Furthermore, it provides an easy-to-use means of programming and debugging the application/process in a multitasking/multiprocessing environment. It integrates multiple control functions and belongs to the category of "Enhanced Programming Methods." The link between objects and/or properties can be automatic (the internal program creates the most logical links or the default links), manual (all links are specified by the user), or semi-auto (combination of auto and manual).

17 Claims, 20 Drawing Sheets

FIG. 6A Default

| Scan Order List | |
|---|---|
| Order | Cell |
| 1 | R1C1 |
| 2 | R2C1 |
| 3 | R3C1 |
| 4 | R4C1 |
| 5 | R1C2 |
| 6 | R2C2 |
| 7 | R3C2 |
| 8 | R1C3 |
| 9 | R2C3 |
| 10 | R3C3 |
| 11 | R4C3 |
| 12 | R5C3 |
| 13 | R1C4 |
| 14 | R6C4 |

120

FIG. 6B Custom example

| Scan Order List | |
|---|---|
| Order | Cell |
| 1 | R1C1 |
| 2 | R2C1 |
| 3 | R3C1 |
| 4 | R4C1 |
| 5 | R1C2 |
| 6 | R2C2 |
| 7 | R3C2 |
| 8 | R1C3 |
| 9 | R2C3 |
| 10 | R3C3 |
| 11 | R5C3 |
| 12 | R4C3 |
| 13 | R1C4 |
| 14 | R6C4 |

122
124

Object Properties:
(object "Picture", cell R1C1)

| 1 | Name | Picture |
|---|---|---|
| 2 | Mode | Strobe |
| 3 | Camera # | 1 |

Object Properties:
(object "Find_part", cell R2C1)

| 1 | Name | Find_part |
|---|---|---|
| 2 | Template # | 4 |
| 3 | Tool_x | 255 |
| 4 | Tool_y | 320 |
| 5 | Tool_ang | 0 |
| 6 | ROI_width | 400 |
| 7 | ROI_height | 200 |
| 8 | Result_x | 200.3 |
| 9 | Result_y | 187.2 |
| 10 | Result_ang | 30.6 |

FIG. 7B

Object Properties:
(object "Find_point", cell R3C1)

| 1 | Name | Find_point |
|---|---|---|
| 2 | Mode | binary |
| 3 | Tool_x | 243 |
| 4 | Tool_y | 120 |
| 5 | Tool_ang | 45 |
| 6 | ROI_width | 100 |
| 7 | ROI_height | 50 |
| 8 | Result_x | 262.0 |
| 9 | Result_y | 110.2 |

134 — row 1; 136 — Find_point; 152 — 262.0; 154 — 110.2

FIG. 7C

Object Properties:
(object "Find_point", cell R4C1)

| | | |
|---|---|---|
| 1 | Name | Find_point |
| 2 | Mode | gray-scale |
| 3 | Tool_x | 300 |
| 4 | Tool_y | R3C1P4 |
| 5 | Tool_ang | 0 |
| 6 | ROI_width | 100 |
| 7 | ROI_height | 50 |
| 8 | Result_x | 270.2 |
| 9 | Result_y | 116.4 |

— pointer to the Object Property #6 in the Cell R3C1

FIG. 7D

Object Properties:
(object "Measure", cell R1C2)

| | | |
|---|---|---|
| 1 | Name | Measure |
| 2 | Mode | 3 |
| 3 | Point1_x | R3C1P8 |
| 4 | Point1_y | R3C1P9 |
| 5 | Point2_x | R4C1P8 |
| 6 | Point2_y | R4C1P9 |
| 7 | | |
| 8 | Result_dist | 10.28 |
| 9 | | |

FIG. 7E

Object Properties:
(object "Timer", cell R2C2)

| | | |
|---|---|---|
| 1 | Name | Timer |
| 2 | Delay [s] | 1.231 |

FIG. 7F

Object Properties:
(object "Move_robot", cell R3C2)

| | | |
|---|---|---|
| 1 | Name | Move_robot |
| 2 | Robot # | 1 |
| 3 | a [m/s*s] | 60 |
| 4 | v [m/s] | 0.5 |
| 5 | x [m] | 1.3 |
| 6 | y [m] | 0.5 |
| 7 | z [m] | 0.1 |
| 8 | R [deg] | 10 |
| 9 | Y [deg] | 30 |
| 10 | P [deg] | 90 |

FIG. 7G

Object Properties:
(object "IF", cell R1C3)

| | | |
|---|---|---|
| 1 | Name | IF |
| 2 | Input | |
| 3 | Number 1 | R4C1P9 |
| 4 | Number 2 | 120 |
| 5 | < | Yes |
| 6 | > | |
| 7 | = | |
| 8 | | |
| 9 | Result | True |
| 10 | | |

— pointer to Object Property #9 in the Cell R4C1

FIG. 7H

Object Properties:
(object "END", cell R3C3)

|   | Name | END |
|---|------|-----|
| 1 | IF | Yes |
| 2 | ELSE | |
| 3 | Scan | |
| 4 | Program | |
| 5 | Type | |

FIG. 7J

Object Properties:
(object "Move_robot", cell R2C3)

|    | Name | Move_robot |
|----|------|------------|
| 1  | Robot # | 1 |
| 2  | a [m/s*s] | 30 |
| 3  | v [m/s] | 0.7 |
| 4  | x [m] | 0.3 |
| 5  | y [m] | 0.7 |
| 6  | z [m] | 0.3 |
| 7  | R [deg] | 0 |
| 8  | Y [deg] | 0 |
| 9  | P [deg] | 0 |

Object Properties:
(object "Output", cell R4C3)

| | Name | Output |
|---|---|---|
| 1 | | |
| 2 | Signal # | 5 |
| 3 | DDE adr | |
| 4 | Value | |
| 5 | RS-232 | |
| 6 | File | |

FIG. 7L

Object Properties:
(object "Obj_Mtrx1", cell R5C3)

| | Name | Obj_Mtrx1 |
|---|---|---|
| 1 | | |
| 2 | Type | 1 |

FIG. 7M

Object Properties:
(object "Custom_DLL", cell R1C4)

| | Name | Custom DLL |
|---|---|---|
| 1 | | |
| 2 | Param_1 | 16 |
| 3 | Param_2 | |
| 4 | Result | |

FIG. 7N

Object Properties:
(object "END", cell R6C4)

| | Name | END |
|---|---|---|
| 1 | | |
| 2 | IF | |
| 3 | ELSE | |
| 4 | Scan | Yes |
| 5 | Program | |
| 6 | Type | |

Object Properties:
(object "MOTOR")

| 1 | Name | Motor |
|---|---|---|
| 2 | Motor # | 4 |
| 3 | speed r/s | 20 |
| 4 | accel r/s$^2$ | |
| 5 | decel r/s$^2$ | |

FIG. 8

Object Properties:
(object "Machine_tool_path")

| 1 | Name | Machine_tool |
|---|---|---|
| 2 | Machine # | 1 |
| 3 | speed % | 80 |
| 4 | tool # | 6 |
| 5 | Point1.x | 0.1 |
| 6 | Point1.y | 0.1 |
| 7 | Point2.x | 0.2 |
| 8 | Point2.y | 0.2 |
| 9 | Point3.x | 0.3 |
| 10 | Point3.y | 0.3 |
| 11 | Point4.x | 0.4 |
| 12 | Point4.y | 0.4 |

FIG. 9

Cell Properties:

| Name | RiCj |
|---|---|
| Thread | A |
| Priority | 16 |
| Wait for | |
| Break Point | OFF |
| Pause [ms] | 0 |
| Message | " " |
| Refresh | no |
| Processor # | 1 |

Cell Properties:

| Name | RiCj |
|---|---|
| Thread | B |
| Priority | 10 |
| Wait for | |
| Break Point | OFF |
| Pause [ms] | 0 |
| Message | " " |
| Refresh | no |
| Processor # | 1 |

Cell Properties:

| Name | RiCj |
|---|---|
| Thread | B |
| Priority | 15 |
| Wait for | R2C1 |
| Break Point | OFF |
| Pause [ms] | 0 |
| Message | " " |
| Refresh | no |
| Processor # | 2 |

Object Properties:
(object "Open_Contact", cell R1C1)

| | Name | Normally Open Contact |
|---|---|---|
| 1 | | |
| 2 | Flow IN | ON |
| 3 | Input # | START |
| 4 | Status | OFF |
| 5 | Flow OUT | OFF |

FIG. 15A

Object Properties:
(object "Closed_Contact", cell R2C1)

| | Name | Normally Open Contact |
|---|---|---|
| 1 | | |
| 2 | Flow IN | ON |
| 3 | Input # | 0001 |
| 4 | Status | OFF |
| 5 | Flow OUT | ON |

FIG. 15B

Object Properties:
(object "Timer", cell R1C2)

| | Name | Timer |
|---|---|---|
| 1 | | |
| 2 | Input 1 | R1C1P5 |
| 3 | Input 2 | R2C1P5 |
| 4 | Preset | 600 |
| 5 | Resolution | 0.1 |
| 6 | Acum. Time | |
| 7 | Register # | 4001 |
| 8 | Output 1 | |
| 9 | Output 2 | |

FIG. 15C

Object Properties:
(object "Coil", cell R1C3)

| | Name | Coil |
|---|---|---|
| 1 | | |
| 2 | Flow IN | R2C1P8 |
| 3 | Output # | 0001 |
| 4 | Output | |
| 5 | Flow OUT | |

FIG. 15D

Object Properties:
(object "Closed_Contact", cell R2C3)

| | | Normally Closed Contact |
|---|---|---|
| 1 | Name | |
| 2 | Flow IN | ON |
| 3 | Input # | 0002 |
| 4 | Status | OFF |
| 5 | Flow OUT | ON |

FIG. 15E

Object Properties:
(object "Counter", cell R1C4)

| 1 | Name | Counter |
|---|---|---|
| 2 | Input | R1C3P4 |
| 3 | Enable/Reset | R2C3P5 |
| 4 | Preset | 60 |
| 5 | Acum. Count | |
| 6 | Register # | 4002 |
| 7 | Output 1 | |
| 8 | Output 2 | |

FIG. 15F

Object Properties:
(object "Coil", cell R1C5)

| 1 | Name | Coil |
|---|---|---|
| 2 | Flow IN | R2C4P7 |
| 3 | Output # | 0002 |
| 4 | Output | |
| 5 | Flow OUT | |

FIG. 15G

METHOD AND APPARATUS FOR CREATING APPLICATION COMPUTER PROGRAMS USING AN OBJECTS EVALUATION MATRIX

TECHNICAL FIELD

The present invention relates generally to computer related or controlled equipment and is particularly directed to a computer application-building system of the type which can define and build automatic control systems without the need for using compilers or being limited to previously fixed-format systems, such as programmable logic controllers or AIM expert systems. The invention is specifically disclosed as an Objects Evaluation Matrix which links together "objects" to create an application program. The invention combines worksheet techniques with object programming techniques and with process control techniques, and creates the links between objects, object properties, and cell properties and presents all pertinent information in a special graphical representation.

BACKGROUND OF THE INVENTION

Computers and other electronic technologies have been used in automation and process control since the 1950's. By the 1990's Programmable Logic Controllers (PLC's), robots, machine vision, personal computers (PC's), Computer Numerical Control machines (CNC), and other computer-controlled machines have become an integral element of manufacturing. The complexity of applications in today's manufacturing requires sophisticated controllers and programs.

Additional demands on flexible and easy-to-use software make the task of programming too difficult to be handled by traditional programming and process control methods. Several attempts (mainly in robotics and machine vision) have been made to solve this issue. However, all these attempts have some limitations—mainly because they do not provide means for creating a control for general processes (in cases using such products known as AIM™, disclosed in U.S. Pat. No. 4,835,730—manufactured by Adept Technology, and Image Analyst™, manufactured by Acquity Inc.) and/or they insist on using a tree-like logical structure with a root (e.g., when using the AIM product), and/or they must generate a new software code to create desired links and evaluation logic (in cases using a product such as PARADYM-31™, manufactured by WIZDOM Controls, Inc.), and/or they insist on using certain databases with predefined fields and certain control logic (e.g., the AIM product). One restriction of conventional AIM products is their reliance on predefined databases even while attempting to solve the historical lack of flexibility in process control programs. In addition, AIM products cannot operate without specific databases.

SUMMARY OF THE INVENTION

Accordingly, it is a primary object of the present invention to provide a product that allows users to create process control applications without the prior art limitations of having to use root-oriented tree-like logical structures, generating new software code to create desired links and evaluation logic, or using certain databases with predefined fields and certain control logics.

It is another object of the present invention to allow users to create process control applications that incorporate the desirable features of object-oriented programming, worksheets, and scanning similar to those used in programmable logic controllers.

It is a further object of the present invention to allow users to create process control applications in which the use of databases is not required, and does not insist on the use of any particular "object" properties or "field assignments" (e.g., speed, acceleration, etc.), nor on their order.

It is still a further object of the present invention to allow users to create process control applications that use an "open architecture" and object-oriented programming.

It is yet another object of the present invention to allow users to create process control applications that can be used in the fields of robotics, machine vision, factory automation, vision guidance, motion control, paint mixing, and other like applications.

A yet further object of the present invention is to provide automation of continuous operations in which, for example, the scan/evaluation procedures are continuously repeated, while allowing the user to segment and partition the control system in an organized fashion.

Additional objects, advantages and other novel features of the invention will be set forth in part in the description that follows and in part will become apparent to those skilled in the art upon examination of the following or may be learned with the practice of the invention.

To achieve the foregoing and other objects, and in accordance with one aspect of the present invention, an improved computer program applications generating system is provided which links together objects to create a complete (or partial) application program. It allows a person to use a computer to graphically place objects into an Objects Evaluation Matrix™ with automatic, semi-automatic, or manual connections among objects. An "object" is defined as an area in computer memory that serves as a basic structural unit of analysis (see "Automation Encyclopedia," p. 435, published by SME, 1988). Inputs and outputs of the object are typically called "properties" of the object (see "Running Visual Basic for Windows," by Ross Nelson, published by Microsoft Press, 1993). The present invention allows the user to organize objects into a complete program. Some examples of objects are: a program, problem component, procedure, subroutine, I/O handler, timers, Boolean logic, jumps, functions, another Object Evaluation Matrix ("Matrix nesting"), an action, activity, skips, labels, decision structures, loop structures, etc.

Still other objects of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

FIG. 6A depicts a list that would appear on a computer display showing the preferred default for the "scan order", used in conjunction with the flow chart of FIG. 2.

FIG. 6B depicts a custom example of a "scan order" list, used in conjunction with the flow chart of FIG. 2.

FIGS. 7A–7N depict computer displays showing examples of "object properties" of various cells depicted in FIG. 5A.

FIGS. 8 and 9 depict computer displays showing example "object properties" for alternative objects not used in the example depicted in FIG. 5A.

FIGS. 10A–10C depict computer displays showing example "cell properties" of example cells of the matrix depicted in FIG. 5A.

FIGS. 15A–15G show examples of "object properties" used in conjunction with the objects of the example Objects Evaluation Matrix of FIG. 14.

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
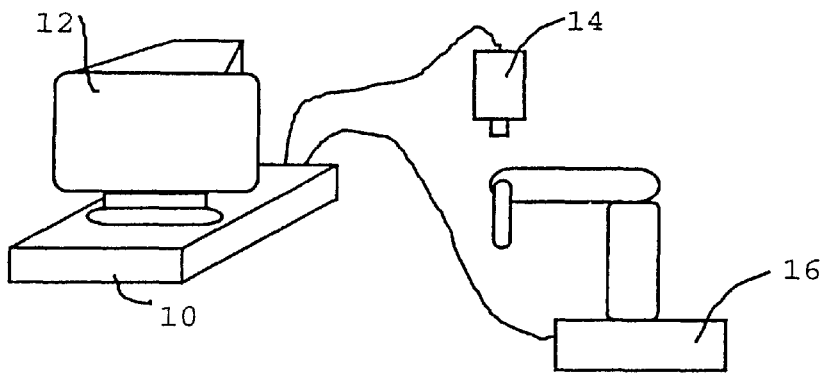
FIG. 1 is a diagrammatic view of a personal computer-based motion-vision/"PLC" automated system, constructed according to the principles of the present invention.

Referring now to the drawings, FIG. 1 shows a personal computer, designated by the index numeral 10, used with a corresponding monitor 12 to perform as a motion-vision system while also acting as a programmable logic controller. This system would receive a signal from a camera 14 used in conjunction with a robot 16.

Figure 2:
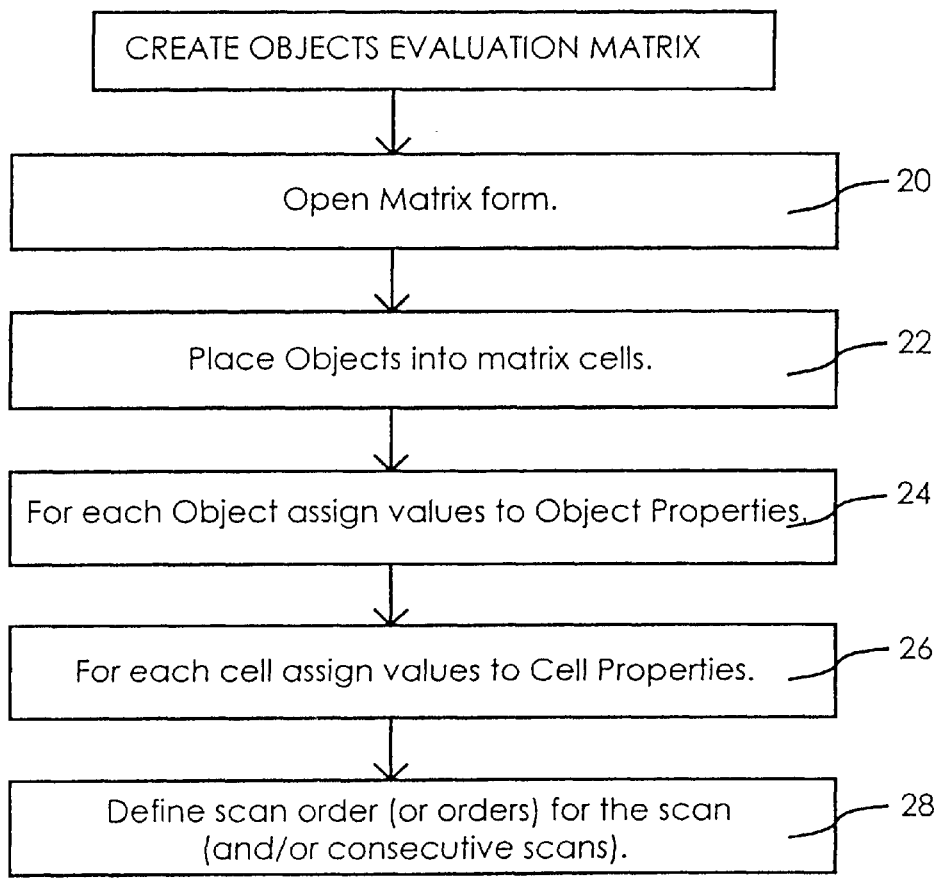
FIG. 2 is a flow chart depicting the logical operations used in creating an application program according to the principles of the present invention.

The computer 10 performs its functions based upon an applications program created by an Objects Evaluation Matrix™ according to the principles of the present invention. In FIG. 2, the logical operational steps to create the Objects Evaluation Matrix are shown, in which a matrix form is opened as the first step, at index numeral 20. Once the matrix form has been opened, one of several available objects is placed into the appropriate matrix cells (at function block 22), in which each object typically is a function to be executed. For each object that is placed into a matrix cell, the user can define the "object properties", which typically are a list of values that correspond to the particular type of object for this particular matrix cell (at function block 24).

At function block 26, each cell of the matrix containing a defined object can now have its associated "cell properties" defined. A list of typical cell properties is provided hereinbelow. At function block 28, the scan order of the cells of the matrix is defined.

Figure 3:
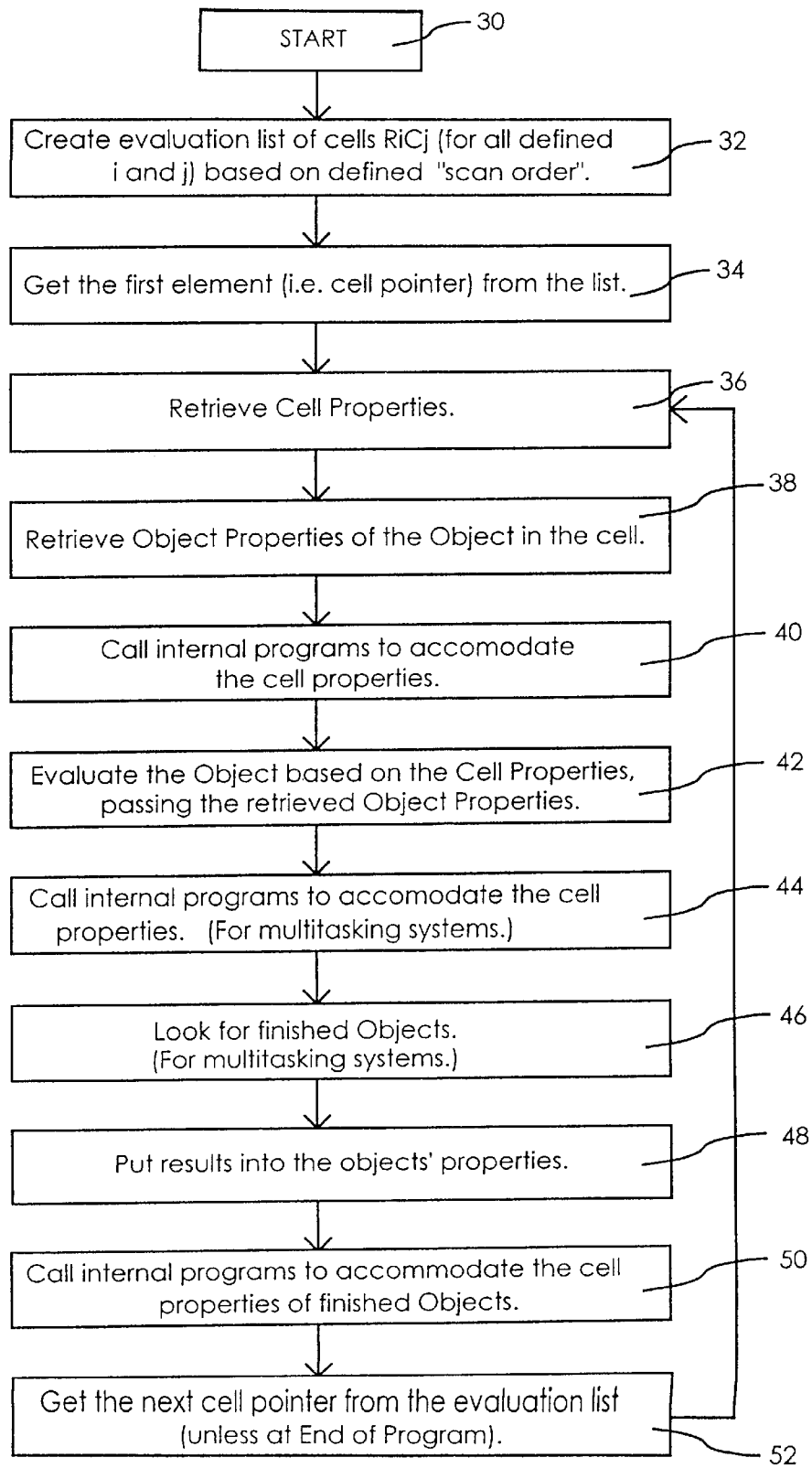
FIG. 3 is a flow chart depicting the logical operations required for executing an application program that was created according to the flow chart of FIG. 2.

FIG. 3 shows the logical operations used in executing an applications program that is created using the present invention's Objects Evaluation Matrix, after the application has been created according to the flow chart of FIG. 2. The execution of the program starts at function block 30, and the first logical operation (at function block 32) is to create an evaluation list of the cells "RiCj" of an Objects Evaluation Matrix, based upon a defined "scan order" (see FIGS. 6A and 6B). The cells that are designated by the defined scan order can be only those cells of the matrix for which objects have been defined and placed. Each cell of the matrix could potentially contain an object, and it will be understood that "Ri" represents the rows and row numbers, and "Cj" represents the columns and column numbers.

The next operation (at function block 34) is to obtain the first element from the evaluation list of cells, and these elements are "cell pointers," as defined by the scan order list. After the first cell pointer has been used to determine a particular cell, the cell's properties are retrieved at function block 36. The next step is to retrieve the object properties associated with the object in that particular cell, as per function block 38.

At function block 40, the cell properties are inspected for the pertinent cell, and the internal programs are called, as needed, to accommodate those cell properties. The next operational step, at function block 42, is the evaluation of the specific object related to the pertinent cell, which is based on the cell properties after passing the retrieved object properties to the object. For multitasking systems, function block 44 calls the internal programs again to accommodate cell properties, as required to accomplish all of the pertinent tasks. The following step of multitasking systems is to look for finished objects (at function block 46). The next step is to put the results into the object's properties, or for multitasking systems, to put the results for all finished objects into the appropriate object's properties (see function block 48).

At function block 50, the pertinent internal programs are called to accommodate the cell properties of the particular finished object (in a non-multitasking system), or for all of the finished objects in a multi-tasking system. At function block 52, the next cell pointer is retrieved from the evaluation list, unless we have reached the end of the application program. Assuming there is a next cell pointer from the evaluation list, the logical flow jumps back to function block 36, at which time the pertinent cell's properties are retrieved, and the entire process begins for that cell. If we have reached the end of the program, the logical flow jumps back to the start, at function block 30, for continuous scanning (akin to a scan order of a programmable logic controller).

Figure 4:
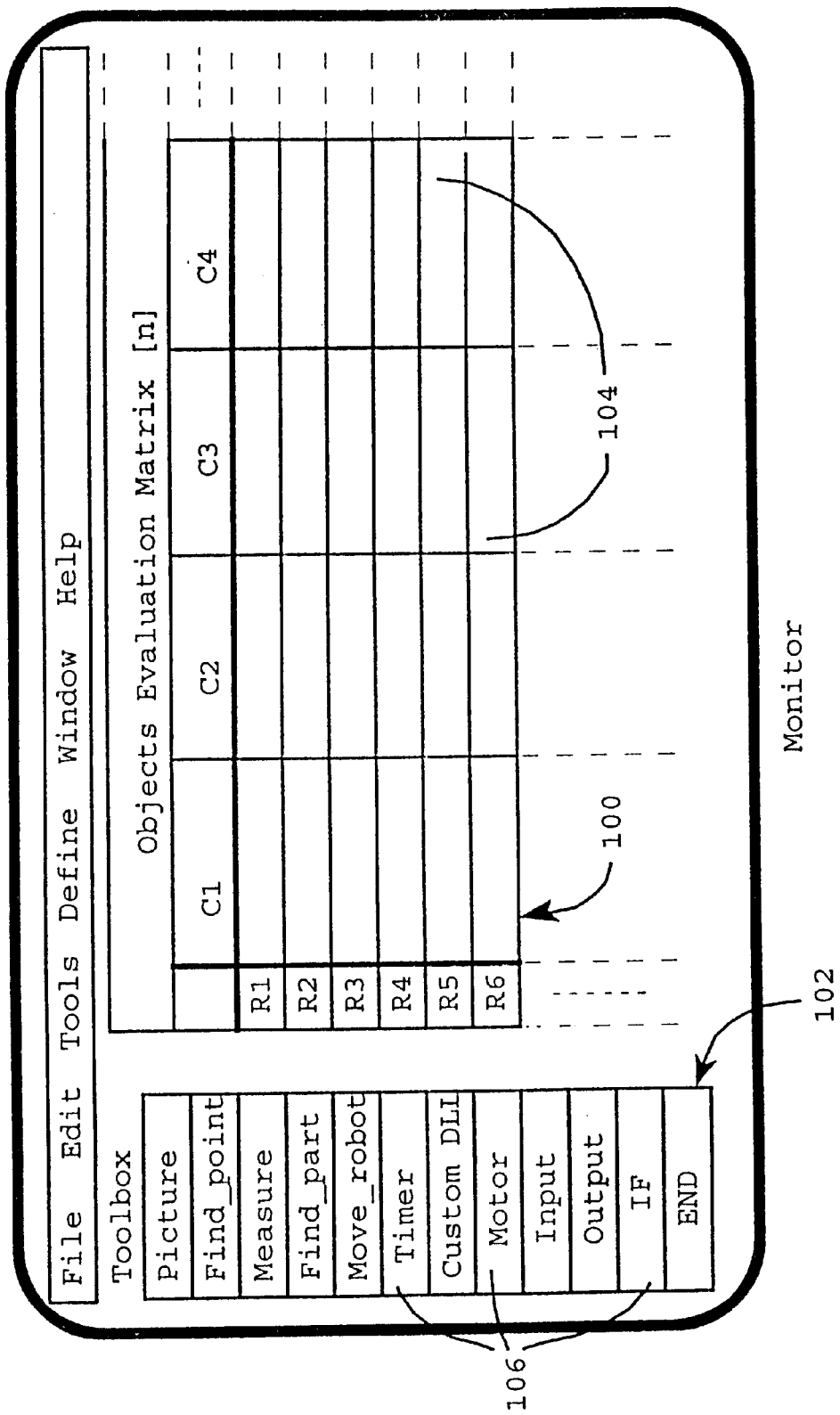
FIG. 4 depicts a computer display which shows a "blank" Objects Evaluation Matrix form with a toolbox and a main pull-down menu (shown as a menu bar), used in conjunction with the flow chart of FIG. 2.

At start-up, the preferred "system" program according to the present invention displays an Objects Evaluation Matrix form 100 and a Toolbox 102, as shown in FIG. 4. (The toolbox itself can be replaced by a "toolbar", or a window with choices, or a pull-down menu, etc.) A main pull-down menu is also included on the display depicted in FIG. 4 for use in performing windows-type functions as well as for navigating through different portions of the preferred system program. Items in the Toolbox in some situations can be represented by icons (not shown). The user begins creating the "application" program by dragging and dropping names (or icons) which are associated with various objects onto the Matrix form.

Each of the empty matrix positions are known as "cells," generally designated by the index numeral 104 in certain locations on FIG. 4, and each cell has an associated row and column number (as easily viewed in FIG. 4). Each of the toolbox selections (as designated by the index numerals 106 in certain locations on FIG. 4) are objects that can be inserted into any of the cells of matrix 100. An example of an Objects Evaluation Matrix that has been completed is provided in FIG. 5A, generally designated by the index numeral 110. An inspection of Objects Evaluation Matrix 110 will show that the objects that have been inserted into the matrix were derived from toolbox 102. For example, at row 1, column 1, the "Picture" object (at index numeral 112) was derived from the "Picture" icon from toolbox 102, as designated by the index numeral 114. As related above, the user merely had to initially click and drag on the picture icon at index numeral 114 and then drag it to the row 1, column 1 position at index numeral 112, and then "drop" the icon at that position.

The evaluation order of objects is specified by the "Objects Evaluation Matrix scan order" at the beginning of each evaluation. By default it is by "columns"—i.e., from top to bottom, and then shifting one column to the right. However, the scan order can be defined to be different and can be changed dynamically (i.e., before each scan).

Before executing the application program, the user can define the scan order of the Matrix 110 via the "Define" pulldown menu selection. The default scan order for this example would appear as shown in FIG. 6A at index numeral 120. The scan order list appears on the video display as a separate window, and it can be moved anywhere on the screen by typical windows-type operations entered by the user. Different methods of displaying this list could easily be implemented without departing from the principles of the present invention, however, the windows approach is preferred.

If the scan order is to be changed from the default, then the user could type in different cell designations on the scan order list, as shown in FIG. 6B. In FIG. 6B, a "custom" scan order list is depicted where cell R5C3 is to be evaluated before the cell R4C3, which is accomplished, for example, by the user typing R5C3 (at index numeral 122) across from scan order number 11, and then typing R4C3 (at index numeral 124) across from scan order number 12. It will be understood that the scan order could be manipulated to have any desirable order, as defined by the user.

Each cell and object must be defined before attempting execution of the application program being built by this procedure. While each object and cell property may have a default assigned to it by the system program, the user nevertheless should inspect all the cell properties and object properties to be certain that they are correct for the specific application to be performed, once the set-up procedure has been completed. After the set-up is completed, the entire configuration (i.e., the Objects Evaluation Matrix with all cell property values, all object property values, and all other parameters) can be saved to a file for easy retrieval or automatic start-up after a boot-up.

When the user begins executing the example application program of FIG. 6A, the initial operation would be the system taking a picture (e.g., with a video camera) based on previously defined "Picture" object properties (these properties will be associated with the cell R1C1 and are shown in FIG. 7A).

Continuing with the description of operation of the example application program, the system then finds a part on the picture based on previously defined "Find_Part" object properties (these properties will be associated with the cell R2C1 and are shown in FIG. 7B). Continuing on, the system finds a point on the picture based on previously defined "Find_point" object properties (which are associated with the cell R3C1 and are shown in FIG. 7C). The system finds another (second) point on the picture based on previously defined "Find_point" object properties which are associated with the cell R4C1 and are shown in FIG. 7D). (Note that the system is using the same code as in the previous step but with different properties).

The system then evaluates the object "Measure" using results (properties) of the cells R3C1 and R4C1, and the "Measure" object properties which are associated with the cell R1C2 (for inputs and also for results as outputs) and are shown in FIG. 7E. The "Measure" object is a program which calculates the distance between a point with x,y coordinates 262.0 (object property #8 in the cell R3C1 at index numeral 152) and 110.2 (object property #9 in the cell R3C1 at index numeral 154), and a point with x,y coordinates 270.2 (object property #8 in the cell R4C1 at index numeral 156) and 116.4 (object property #9 in the cell R4C1 at index numeral 158). The result 10.28 is put into the object property #8 in the cell R1C2 at index numeral 142.

The system waits (using a time delay) based on previously defined "Timer" object properties (which are associated with the cell R2C2 and are shown in FIG. 7F). The system now causes a robot to move based on previously defined "Move_robot" object properties (which are associated with the cell R3C2 and are shown in FIG. 7G).

The system starts evaluating the object "IF" (a logic structure) based on previously defined "IF" object properties (which are associated with the cell R1C3 and are shown in FIG. 7H). Based on these "IF" conditions, the system causes a robot to move using "Move_robot" object properties (that are associated with the cell R2C3 and are shown in FIG. 7I). The system evaluates the object "END" (a logic structure) based on previously defined "END" object properties. These properties are associated with the cell R3C3 (which is the end of the "IF" logic structure) and are shown in FIG. 7J.

The system now evaluates the object "Output" (digital or analog output) based on previously defined "Output" object properties (which are associated with the cell R4C3 and are shown in FIG. 7K). The system evaluates the object "Objects Evaluation Matrix 1" (another Objects Evaluation Matrix) based on previously defined "Obj_Mtrx1" object properties (which are associated with the cell R5C3 and are shown in FIG. 7L). A call to a second Objects Evaluation Matrix is known as "matrix nesting."

The system evaluates a custom object "Custom DLL" (a Dynamic Linked Library created by the user) based on previously defined DLL's object properties which are associated with the cell R1C4 and are shown in FIG. 7M).

The system evaluates the object "END" (a logic structure) based on previously defined "END" object properties (which are associated with the cell R6C4 and are shown in FIG. 7N). Once this final step has occurred, the system repeats the entire application program cycle again starting at the cell R1C1.

The cells R3C2 and R2C3 are marked with an asterisk (*) on FIG. 5A, which means some "special" cell properties were selected (see below about cell properties). In these two cases the cell property denoted as "Processor #" is set equal to "2" which means that the evaluation of this object (i.e., program) is done on the second processor (available only for multiprocessor/multitasking systems). An example of cell properties is provided in FIG. 10C.

The "object properties" consist of all inputs to an object and all outputs (results) of an object. Each individual property can be specific (e.g., a value, string, etc.), or can be a pointer to another object property. When clicking twice on the object in the cell, the properties of that object (associated with that cell) will be displayed for editing. An example of displayed properties of an object is given in FIG. 7A, which depicts the names of each property along the left-hand column, and the values or pointers of those associated properties along the right-hand column. For example, the camera number as a property name or property designation is given at index numeral 130, and its associated value (i.e., "1") is given at index numeral 132.

The object properties are pre-determined by an object property determining function which typically is different for each type of object. For example, in FIG. 5A, clicking twice on the "Find_point" icon in cells R3C1 and R4C1 and on the "Measure" icon in the cell R1C2 would display properties of these objects (related to those cells) which could look as shown in FIGS. 7C, 7D, and 7E.

It can be seen in these figures that the two "Find_point" objects have the same list of properties, but with different values in each. As an example, the "Mode" property designation at index numeral 134 in FIG. 7C has a value of "binary" at index numeral 136. In FIG. 7D, the "Mode" property designation at index numeral 138 has a value of "gray-scale" at index numeral 140. These are both "Find_point"—type objects used for both of these cell locations (i.e., cells R3C1 and R4C1), but each has different values, as is obvious when comparing FIGS. 7C and 7D to one another. The properties of the "Measure" object (see FIG. 7E) use pointers to reference the inputs to this "Measure" object rather than using any fixed values. The object "Measure" is using the results of the two "Find_point" objects and calculates the distance between the two found points, then puts the result into its "Result_dist" property (at index numeral 142). (The "Result_dist" property was determined by the program that created the object.)

The use of the pointers referred to in the above paragraph gives the user great flexibility when defining certain operations such as performing measurements. In the illustrated example, there are four pointers listed as being associated with object properties for the "Measure" property. This is shown in FIG. 7E at the index numerals 144, 146, 148, and 150. At index numeral 144, for example, the designation "R3C1P8" refers to the cell R3C1, which is defined as an object type "Find_point" (see index numeral 116 on FIG. 5A). This object has properties as shown in FIG. 7C, and the eighth property is designated as "Result_x", and has a value of 262.0, as indicated at index numeral 152. In FIG. 7E, the index numeral 144 designation of R3C1P8 refers precisely to the eighth property of the object that resides at the cell location R3C1 (i.e., at index numeral 152).

The same type of "pointer logic" is invoked by designating the fourth, fifth, and sixth object properties for the "Measure" property as being pointers, located on FIG. 7E at index numerals 146, 148, and 150. The pointer at index numeral 146 is pointing to the data value at index numeral 154 of FIG. 7C (i.e., the ninth object property of the object residing in the cell R3C1). The pointer at index numeral 148 is pointing to the value at index numeral 156 on FIG. 7D (i.e., the eighth object property of the object residing at cell R4C1). Finally, the index numeral 150 is pointing to the value at index numeral 158 on FIG. 7D (i.e., the ninth property of the object residing at cell R4C1).

Figure 5A:
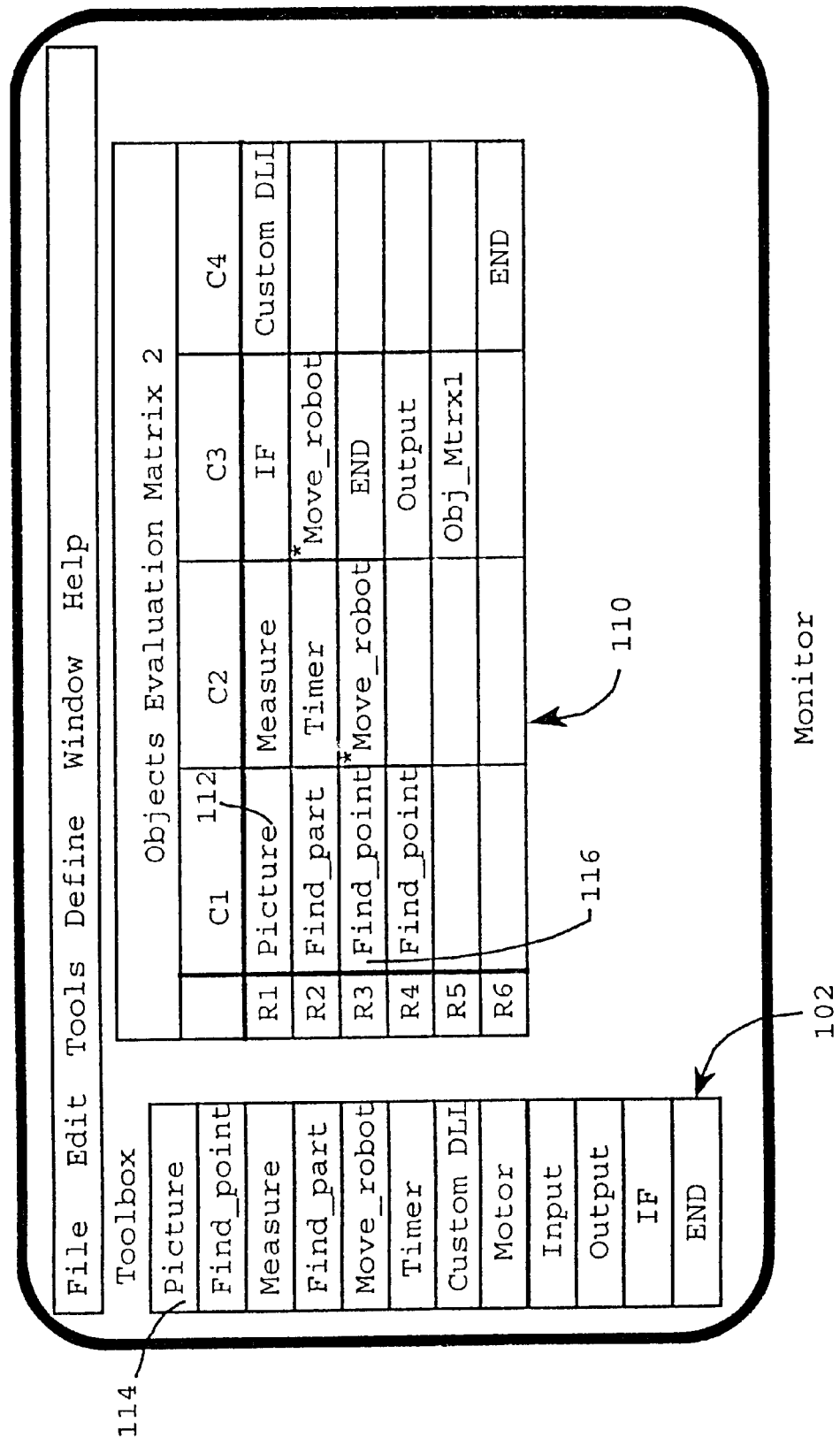
FIG. 5A depicts a computer display showing an example of a "final" Objects Evaluation Matrix form based upon the "blank" form depicted in FIG. 4.
Figure 5B:
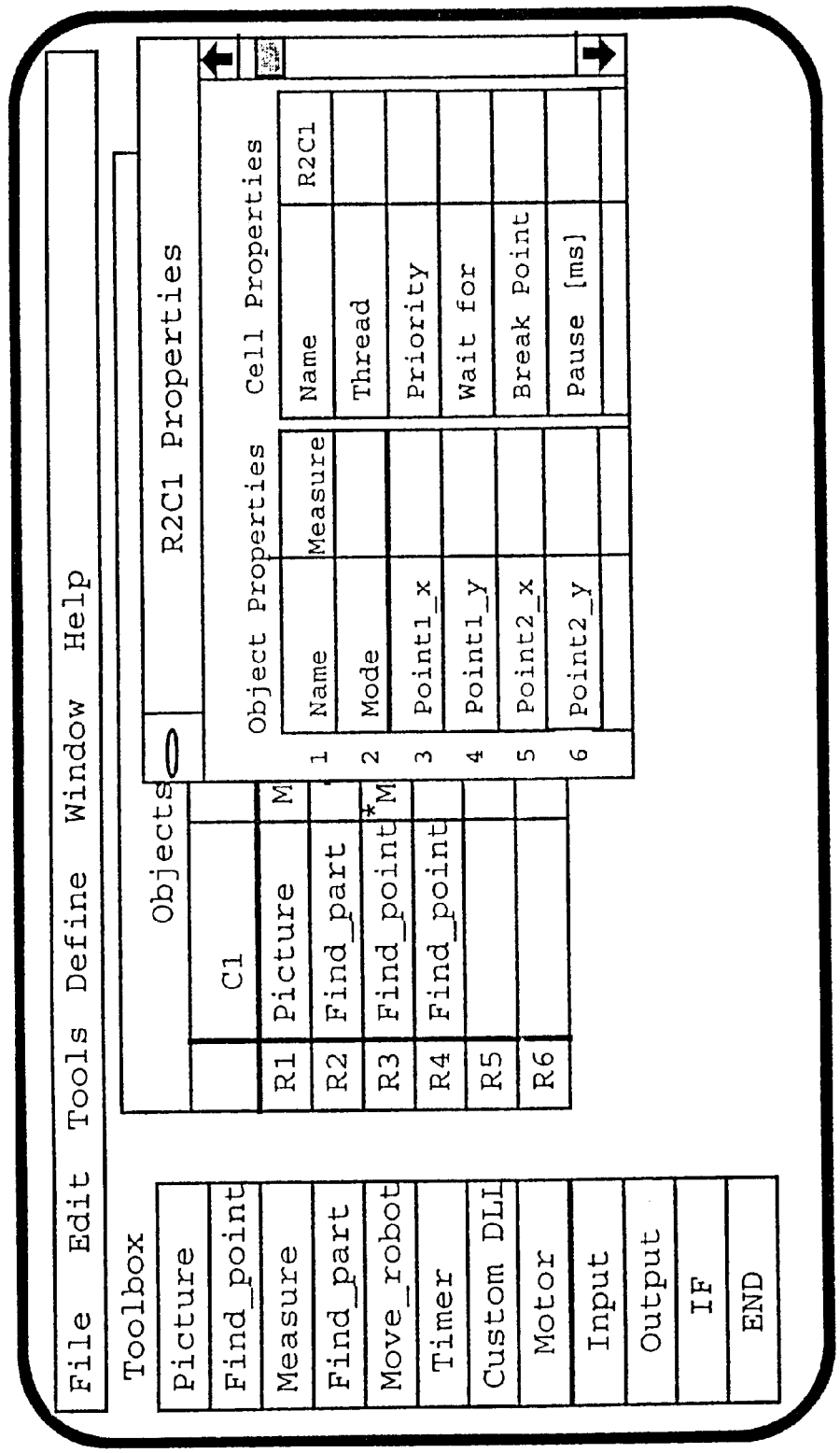
FIG. 5B depicts the Objects Evaluation Matrix of FIG. 5A in one window of a computer display, and a second window (in cascade mode) which contains object and cell properties for one of the matrix's cells.

As can be seen in FIGS. 7F–7P, all of the other types of objects listed in the Objects Evaluation Matrix 110 of FIG. 5A have properties, and examples of such are provided in these figures. These will be discussed in more detail hereinbelow.

Other examples of objects and object properties are depicted in FIGS. 8 and 9. In FIG. 8, a "Motor" is listed as the object, and has properties that would be standard for many motors, including a motor number (its designation in the system) and a motor speed in revolutions per second (or which could be expressed in revolutions per minute). In FIG. 9, the type of object is a machine tool path, which has various object properties that are presented in FIG. 9.

It will be understood that any of the values in a list of object properties (i.e., the right-hand column) could be designated as pointers rather than values. For example, in FIG. 9, each of the "x" or "y" coordinates listed in the object properties numbers 5–12 could be designated as a pointer such as R3C1P8. In this way, the system program can be set up so that a user can enter a data point at a single location (i.e., as a property of a single object in the system), and several other object properties could point to that particular value, so the single data point entered by that user could affect numerous operations or objects of the overall control system.

Every cell of an Object Evaluation Matrix has its own individual set of "cell properties" which selectively define special actions, such as a "thread" and associated thread's priority for the cell evaluation (used in multitasking systems only), error recovery method, breakpoint, pause, wait for another cell to be finished (in multitasking and multiprocessing systems only), message generation to an interface device, refreshing the operator's interface, processor assignment (in multiprocessing systems only), etc. The types of cell properties are the same for each cell, regardless of the cell's function. Some of the typical cell properties are:

"Thread"—the thread that is assigned for the cell evaluation.

"Priority"—the priority that is assigned for the cell evaluation.

"Wait for"—wait for a special event before cell evaluation.

"Break Point"—break after cell evaluation for debugging.

"Pause"—pause x ms after cell evaluation.

"Message"—display a message after cell evaluation.

"Refresh"—refresh the operator window interface after cell evaluation.

"Processor #"—the processor that is assigned for the cell evaluation.

In multitasking systems, threads, priority levels, processor numbers, tasks, and kernels all have specific meanings. Such terminology used herein shall have the meanings as discussed in a book titled, "Mastering Windows NT Programming," by Brian Myers and Eric Hammer, published by Sybex, 1993.

The cell properties of cells R1C1,R2C1, R1C2,R2C2, R1C3,R3C3, R1C4, and R6C4 in the illustrated example could have settings as shown in FIG. 10A. The cell properties of cells R3C1,R4C1,R5C3,R4C3 could have settings as shown in FIG. 10B. The cell properties of cells R3C2 and R2C3 could have settings as shown in FIG. 10C.

Figure 11:
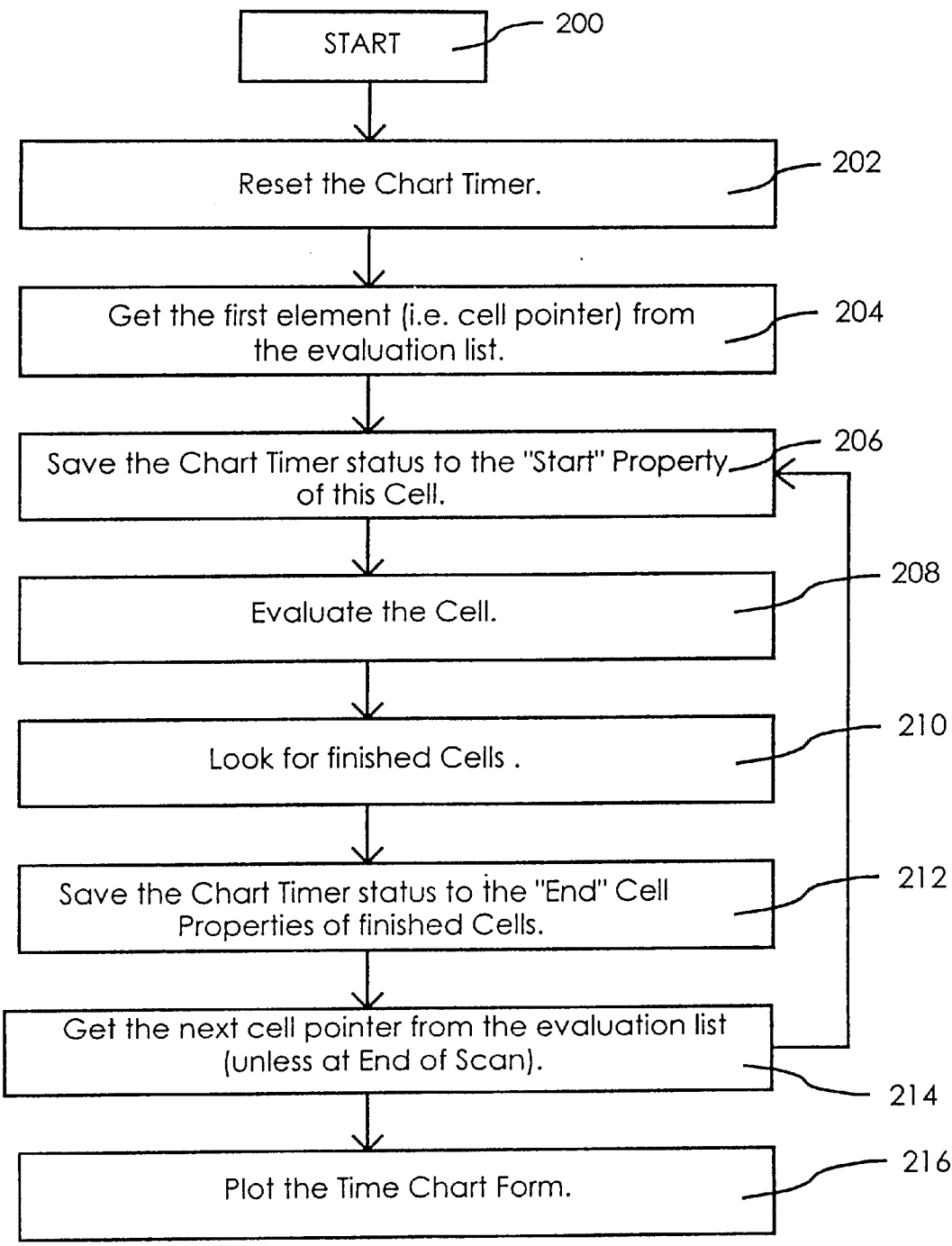
FIG. 11 is a flow chart showing the logical operations required to create a "time chart" (see FIG. 12) based upon information that is determined after executing an application program that has been created using the flow chart of FIG. 2, after being executed according to the flow chart of FIG. 3.
Figure 12:
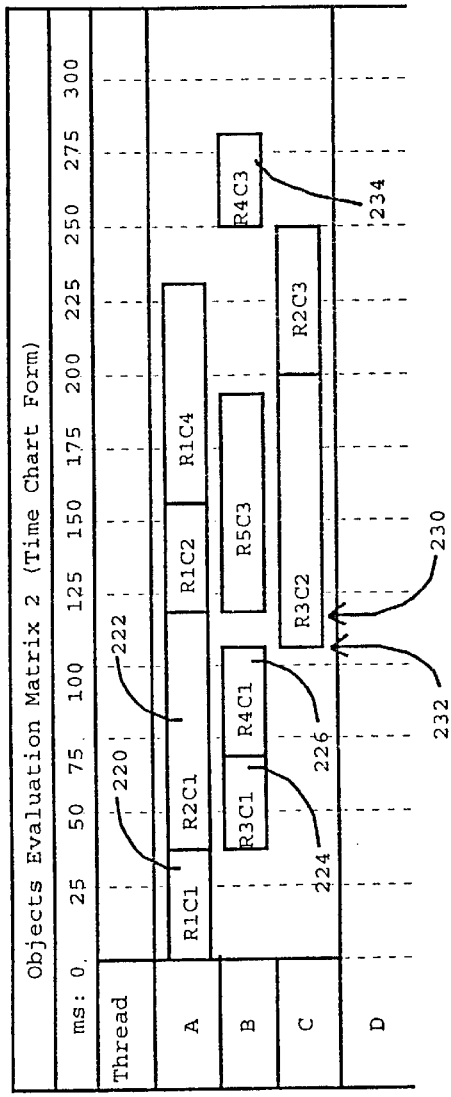
FIG. 12 depicts a computer display showing the time chart that has been created after the execution of the flow chart of FIG. 11, and based upon the example provided in FIG. 5A.

The Object Evaluation Matrix can be also displayed in a "Time Chart" form (see FIG. 12). This feature is very important, especially for multitasking systems where the cells can execute in different tasks and/or on different processors (e.g., cell properties above) and with different priorities. The Time Chart Form provides organized control flow and easy debugging in multitasking environments. The Time Chart can be created only after the application program created by the present invention has been executed through at least one cycle, or partial cycle. The "chart" timer is started at the beginning of an application program cycle. At the beginning and end of each cell evaluation, the status of this timer is recorded. The results are then plotted in a time chart form as illustrated in FIG. 12. The logic flow used to create a Time Chart is outlined in the flow chart of FIG. 11.

In FIG. 11, an execution cycle is started at function block 200. The chart "timer" is initially re-set to zero, at function block 202. At function block 204, the first element listed on the scan order list (e.g., see function block 32 on FIG. 3) is acquired, and its first element is always a cell pointer. Each cell has a "start" property and an "end" property which are used to store real time values that are used in creating the time chart for this application program. At function block 206, the chart timer status (i.e., a value of time) is stored at the "start property" of the cell just as the cell begins to be evaluated. At function block 208, the cell is evaluated (i.e., executed, or a value is derived), and at function block 210 the system looks to find finished cells. It will be understood that in non-multitasking systems, function block 210 would always know which cell was about to become "finished," whereas in a multitasking system more than one cell could become finished during this particular "cycle" through the chart timer creation procedure.

At function block 212, the chart timer status is acquired and placed at the "end" cell property of each cell that has "finished" during this time chart "cycle." The next step is to acquire the next cell pointer from the scan order list (at function block 214), unless we are at the end of the scan. If we are not at the end of the scan, the logical flow is directed back to function block 206 where the chart timer status is saved to the "start" property of the next cell. If we have reached the end of the scan, the time chart form is created and plotted at function block 216, an example of which is seen in FIG. 12.

FIG. 12 represents a time chart form as it would appear using the example values for the object properties as provided in FIGS. 7A–7P, the cell properties as given in FIGS. 10A–10C, and the Objects Evaluation Matrix 110 as presented in FIG. 5A.

From FIG. 12 we can immediately see the process time breakdown as it applies to individual threads. First, the system acquired a (video) picture at index numeral 220 (the cell R1C1 which contained the object "Picture") which took about 38 ms. Then two tasks started simultaneously in two threads—one task, at index numeral 222, looked for a part (the cell R2C1 which contained the object "Find_part") and the second task 224 looked for a first point (the cell R3C1 which contained the object "Find_point"). After finding the first point, the system started looking for a second point at index numeral 226 (the cell R4C1 which contained the object "Find_point") while still working in thread B and simultaneously with the object "Find_part" in thread A at 222. The cell R2C1 (the "Find_part" function) was finished about 120 ms from the beginning of the scan, as is discerned by the time mark at index numeral 230. The cell R4C1 (the second "Find_Point" function) was finished about 105 ms from the beginning of the scan, as indicated by the time mark at index numeral 232. The entire matrix evaluation took about 280 ms (occurring at the end of the cell R4C3 at index numeral 234).

It will be understood that FIG. 12 depicts a multi-tasking system (i.e., threads A, B, and C are all performing simultaneously). It will be further understood that in a non-multitasking system, there would only be one thread on a particular time chart.

Figure 13:
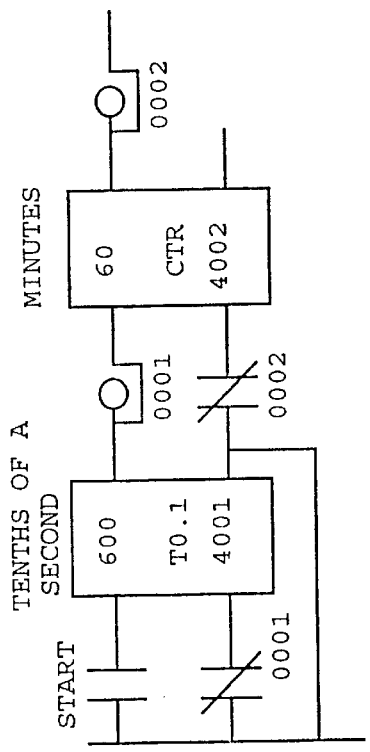
FIG. 13 shows an example ladder logic diagram which is commonly used in programming PLC's, known in the prior art.
Figure 14:
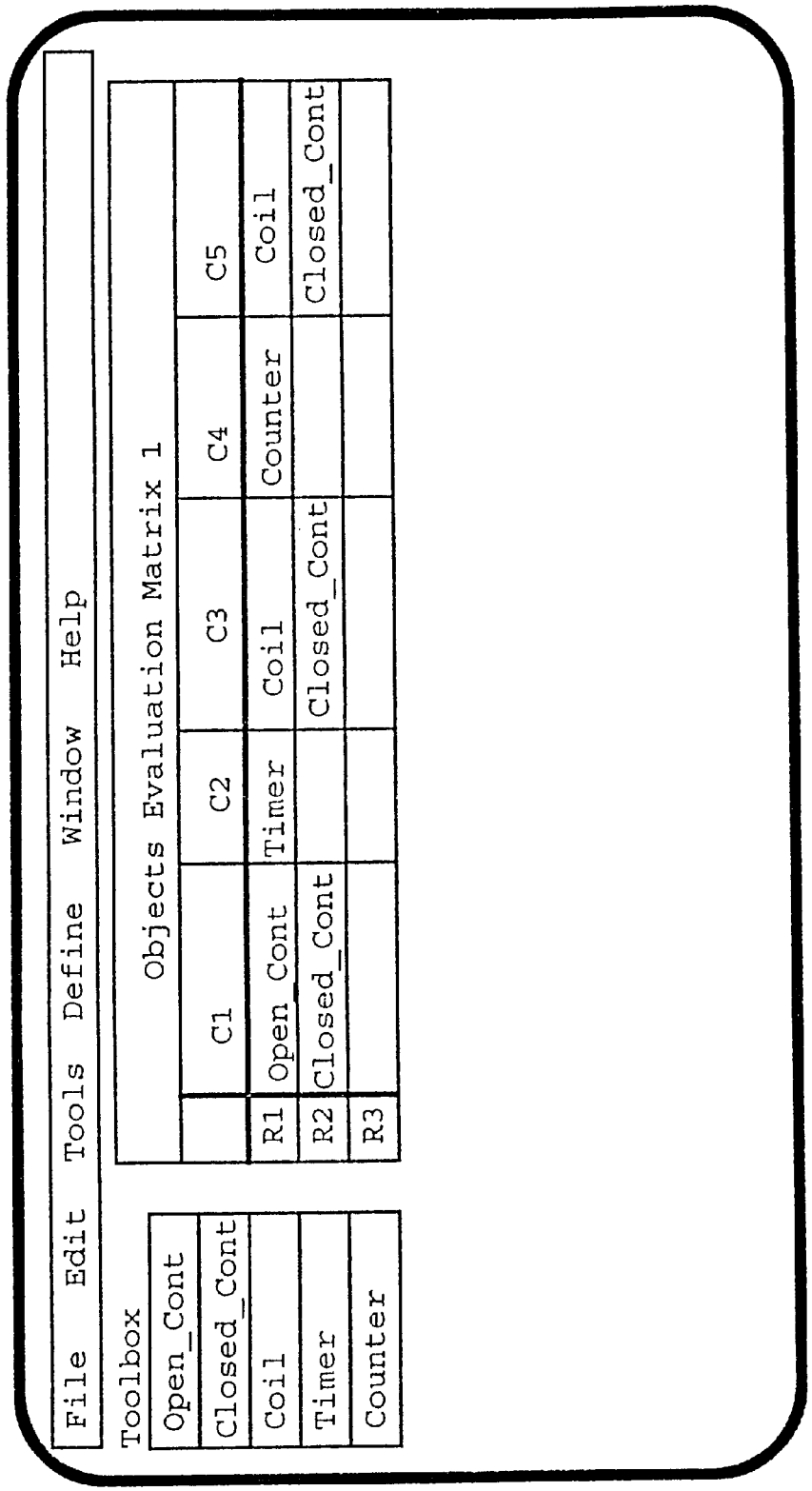
FIG. 14 depicts a computer display showing an example Objects Evaluation Matrix which could be used in lieu of a programmable logic controller running the ladder logic diagram of FIG. 13, using the principles of the present invention.

As related above, the Objects Evaluation Matrix also can be used as a PLC ladder. An example of this is. illustrated in FIG. 13, in which a PLC ladder diagram produces a clock measuring time in minutes using a timer/counter network. The same operation can be achieved via an Objects Evaluation Matrix using PLC-type components (e.g., contacts, coils, timers, counters, etc.) as objects (as illustrated in FIG. 14). The object properties of these objects preferably would have settings as shown in FIGS. 15A–15G. The fact that the Objects Evaluation Matrix can easily accommodate PLC components is a very powerful feature of the present invention, especially when combined with other object types, such as "Picture", "Move_Robot", etc.).

Figure 16:
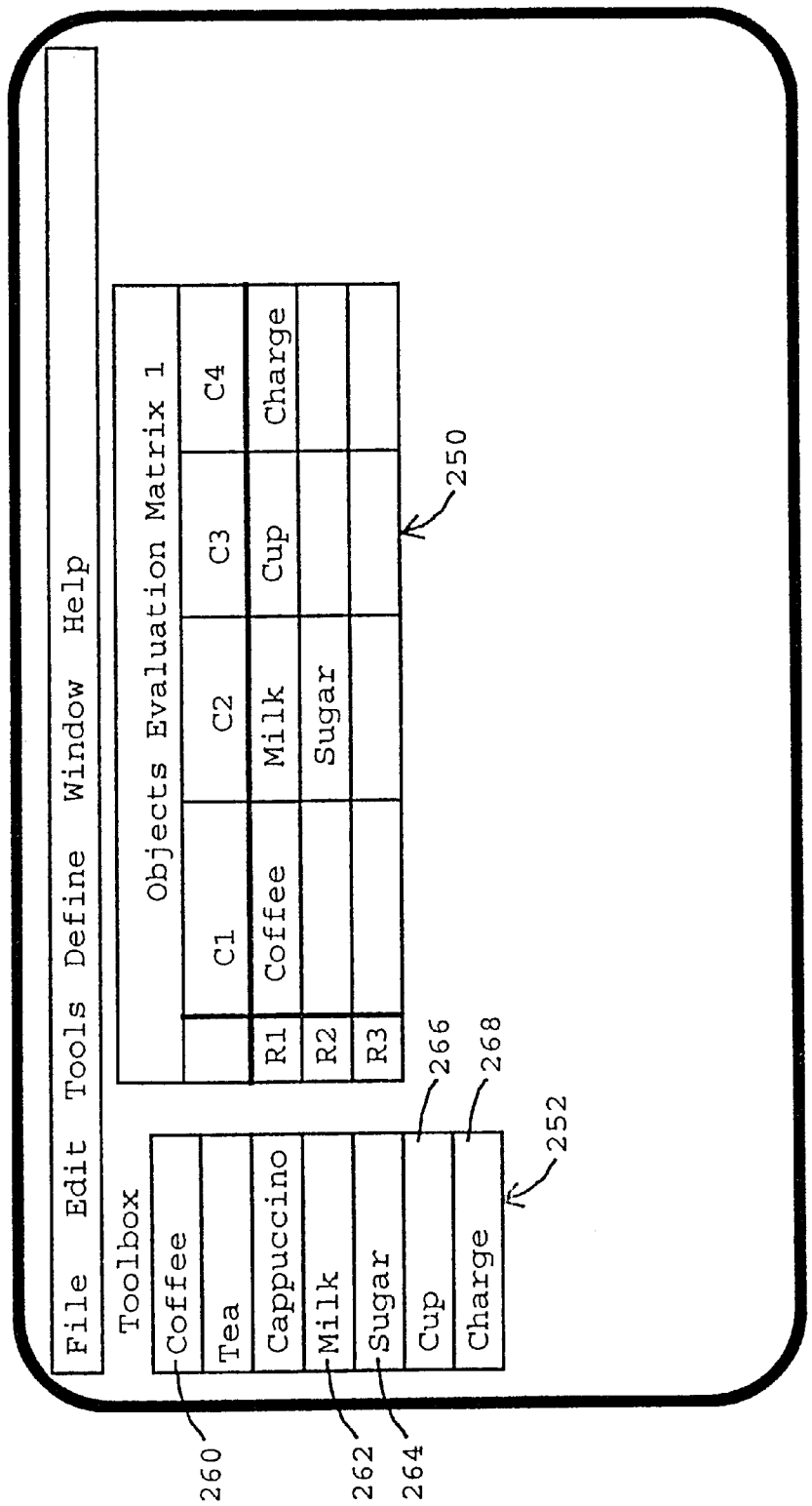
FIG. 16 depicts a computer display showing an example Objects Evaluation Matrix, tool box, and menu bar describing the operation of an automatic coffee/tea/cappuccino machine connected to a personal computer, constructed according to the principles of the present invention.

Another example of the use of the Objects Evaluation Matrix is an emulation of simple handling of object modules. In the example Objects Evaluation Matrix depicted by the index numeral 250 in FIG. 16, a coffee/tea/cappuccino machine could be controlled by connection to a personal computer that contains an application program derived from this Objects Evaluation Matrix. The toolbox shown in FIG. 16 lists seven (7) different types of objects, each one potentially representing a separately-compiled object module. In this circumstance, the first module could be used to brew coffee, the second module could be used to make tea, and the third module could be used to make cappuccino. The fourth module (i.e., the "milk" object) could be designed to add milk to any one of the above three drinks. The fifth module (i.e., the "sugar" object) could be used to add sugar to any one of the three above drinks. The sixth module (i.e., the "cup" object) would be used to select the proper cup for one of the three drinks. Finally, the seventh module (the "charge" object) would be used to bill the customer the proper amount of money.

Figure 17:
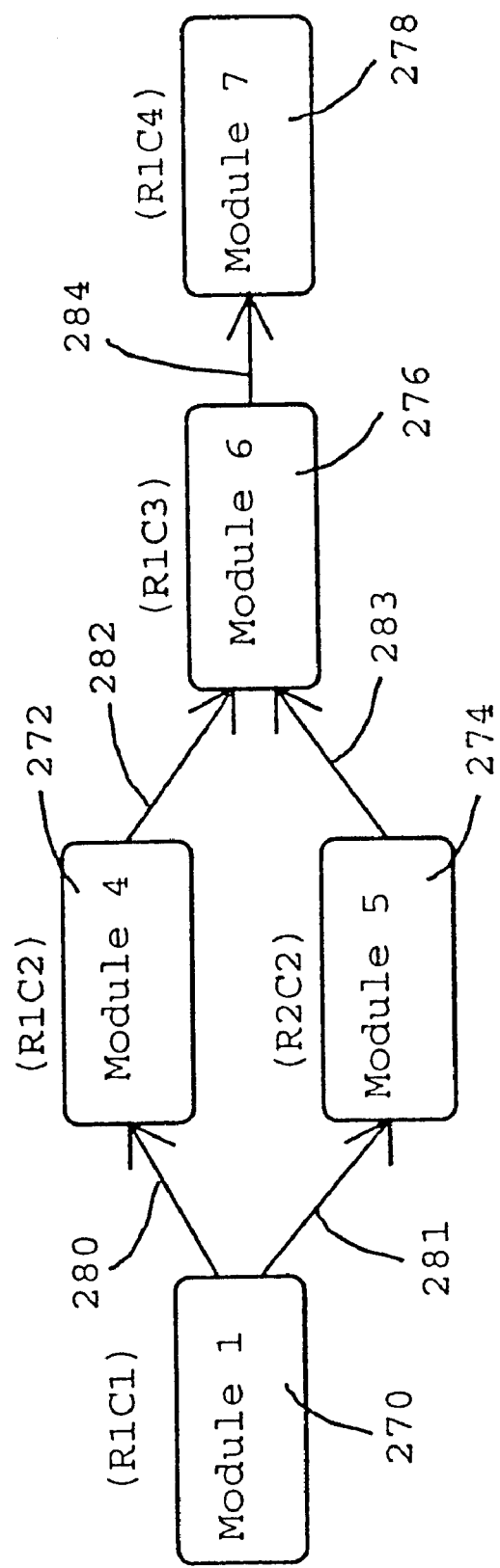
FIG. 17 is a schematic diagram showing the links between object modules that, for example, would be generated by standard computer programming techniques needed to create an automatic control system for the coffee/tea/cappuccino machine application, similar to that depicted in FIG. 16.

The method for utilizing the various objects of Objects Evaluation Matrix 250 (see FIG. 16) is completely up to the user, as defined by the scan order list (such as list shown in FIG. 6B for a different system). The seven object modules available to perform any of the objects listed in the toolbox 252 could be linked together in a manner as viewed in the diagram of FIG. 17. In FIG. 17, the Objects Evaluation Matrix 250 is performing a function of brewing sweet coffee with milk, in which the coffee object (at index numeral 260) is equivalent to "Module 1" at index numeral 270 in FIG. 17. The milk object at index numeral 262 would be equivalent to "Module 4" at index numeral 272. The sugar object at index numeral 264 is equivalent to "Module 5" at index numeral 274. Finally, the cup object and the charge object at index numerals 266 and 268, respectively, are equivalent to "Module 6" and "Module 7" at index numerals 276 and 278, respectively.

If the default scan order list is used for Objects Evaluation Matrix 250, then the application program will perform precisely in the manner as the linked modules depicted in FIG. 17. This is essentially equivalent to programming in an object oriented programming system, in which each object module is represented by an icon or other "flag" symbol, and each object module is linked to one or more other object modules by arrows (such as arrows 280–284 on FIG. 17), although in using object oriented programming languages, it is common for the arrows to list the variables or other parameters that are being passed from module to module.

It will be understood that the orientation of the objects located in the particular cells of any Objects Evaluation Matrix of the present invention is completely independent of any physical or graphical representation of linked modules as one might see in an object oriented programming environment. This is so because the scan order list can be completely customized in the Objects Evaluation Matrix programming system of the present invention, so any object can be performed at any time, regardless of its position in the Objects Evaluation Matrix.

It will be further understood that the user of the Objects Evaluation Matrix programming system has the capability of creating custom object modules and will also have the capability of defining any and all necessary object properties for each of those object modules. These object modules and object properties can easily be integrated into an Objects Evaluation Matrix, and the object properties would be able to be specified and have its values manipulated by the user by using the toolbox and object properties displays within the system program.

The Objects Evaluation Matrix and its graphical representation provides an easy to use method for evaluating any object code with different properties and for linking objects and object properties. One advantage of this approach is in the evaluation logic of objects (using spreadsheet type evaluation), and in the graphical representation of the application configuration. This method can be used in conjunction with known process control techniques, such as program control ladders and logic trees, PC software packages (data base management, worksheets), and industrial packages as AIM, Paradym-31™, Image Analyst™, and Check-Point™.

The Objects Evaluation Matrix of the present invention can work as a "PLC" ladder, as a standard logic tree evaluator, or as a simple worksheet, but it also provides a general link methodology between objects and their properties, which allows an application to be built without coding and/or recompiling. The evaluation order of the objects is independent of the link among properties, which can be of any complex structure (i.e., does not have to be a "tree" structure). Furthermore, the additional link to cell properties provide high flexibility and easy-to-use programming in multitasking multiprocessing environments. The Time Chart Form of the Objects Evaluation Matrix enables the system to be easily programmed and debugged in time-critical applications and processes. The structure of the Objects Evaluation Matrix is so powerful that it can even allow a new programming language to be created using the "drag and drop" technique.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

I claim:

1. In a computer system having a processing circuit, a memory circuit for executing computer programs, and a memory circuit for storing computer programs; a method for creating a computer application program comprising the steps of:
    (a) creating an objects evaluation matrix having at least one row and at least one column, thereby creating a plurality of cells, a cell at each row and column position;
    (b) placing at least one object into the appropriate of said cells by use of visual choices presented to a human user, said visual choices being selectable for insertion into said appropriate cells, said object comprising a function for controlling a process, and said process occurring external to said computer system;
    (c) defining object properties for each said object included in the objects evaluation matrix by use of choices of pre-determined object properties, wherein said human user determines a corresponding value for each of said object properties; and
    (d) defining cell properties for each said cell that contains an object included in the objects evaluation matrix by use of choices of pre-determined cell properties, wherein said human user determines a corresponding value for each of said cell properties.

2. The method as recited in claim 1, wherein said visual choices presented to the human user are presented in a list format.

3. The method as recited in claim 1, wherein different types of objects have different properties associated therewith.

4. The method as recited in claim 1, wherein objects of the same type have the same properties associated therewith, but have different values for at least one of said associated properties.

5. The method as recited in claim 1, wherein said object properties includes at least one of a numeric value, pointer, variable name, and string.

6. The method as recited in claim 1, wherein said cell properties includes at least one of a numeric value, pointer, variable name, and string.

7. In a computer system having a processing circuit, a memory circuit for executing computer programs, and a memory circuit for storing computer programs; a method for creating and executing a computer application program wherein:
    said method for creating said computer application program comprises the steps of:
        (a) creating an objects evaluation matrix having at least one row and at least one column, thereby creating a plurality of cells, a cell at each row and column position;

(b) placing at least one object into the appropriate of said cells by use of visual choices presented to a human user, said visual choices being selectable for insertion into said appropriate cells;

(c) defining object properties for each said object included in the objects evaluation matrix by use of choices of pre-determined object properties, wherein said human user determines a corresponding value for each of said object properties; and (d) defining cell properties for each said cell that contains an object included in the objects evaluation matrix by use of choices of pre-determined cell properties, wherein said human user determines a corresponding value for each of said cell properties; and said method for executing said computer application program comprises the steps of:

(a) initially determining the scan order of said cells containing objects of said objects evaluation matrix;

(b) repeatedly changing said scan order when desirable, and scanning through said cells containing objects using the following sub-steps per cell:
  (i) retrieving said associated cell properties;
  (ii) retrieving said associated object properties;
  (iii) executing internal programs relating to said retrieved cell properties;
  (iv) evaluating the associated object resided in said cell while using said retrieved object properties;
  (v) placing results of said object evaluations into said object properties;
  (vi) executing internal programs relating to said retrieved cell properties of the finished object; and
  (vii) going to the next cell to be scanned in said repetitive step, unless at end of said computer application program.

8. The method as recited in claim 7, wherein said sub-step of executing internal programs relating to said retrieved cell properties includes defining functions, including the function of displaying messages.

9. The method as recited in claim 7, further comprising the sub-step of simultaneously executing other internal programs in a multitasking system.

10. The method as recited in claim 9, wherein said sub-step of simultaneously executing other internal programs includes the execution of programs having different functions from one another.

11. The method as recited in claim 9, wherein said sub-step of simultaneously executing other internal programs includes the execution of more than one program having the same function, however, each said program having one of different object properties from one another and different cell properties from one another.

12. The method as recited in claim 7, further comprising the sub-step in a multitasking system of simultaneously evaluating the associated object resided in a plurality of said cells while using said retrieved object properties, and placing results of said object evaluations into said object properties as each said evaluation of said associated object becomes finished.

13. The method as recited in claim 7, further comprising the sub-step in a multitasking system of simultaneously creating a time chart based upon the amount of time required to complete each system task that relates to the completion of the evaluation of each associated object.

14. A method, executed in a computer system, of implementing an external process control function in an application program under the operation of a user, where the application program uses an objects evaluation matrix to store and manipulate objects, where the objects evaluation matrix comprises a two dimensional grid of intersecting columns and rows, where the intersection of each column and row is a cell, and where a cell may contain an object, the method comprising the steps of:

(a) placing at least one object into the appropriate of said cells by use of visual choices presented to a human user, said visual choices being selectable for insertion into said appropriate cells;

(b) defining object properties for each said object included in said objects evaluation matrix by use of choices of pre-determined object properties, wherein said human user determines a corresponding value for each of said object properties; and (c) defining cell properties for each said cell that contains said object included in said objects evaluation matrix by use of choices of pre-determined cell properties, wherein said human user determines a corresponding value for each of said cell properties.

15. A process control programming environment, where a user can develop a computer program that is capable of controlling processes external to the computer, said programming environment comprising:

(a) an objects evaluation matrix having at least one row and at least one column, thereby creating a plurality of cells, a cell at each row and column position;

(b) at least one object capable of being placed into the appropriate of said cells by use of visual choices presented to a human user, said visual choices being selectable for insertion into said appropriate cells;

(c) each said object included in the objects evaluation matrix having pre-determined object properties; and (d) each said cell that contains an object included in the objects evaluation matrix having predetermined cell properties, wherein said human user determines a corresponding value for each of said cell properties.

16. The programming environment of claim 15 wherein said pre-determined object properties have default values that are modifiable by the user.

17. The programming environment of claim 15 wherein said pre-determined cell properties have default values that are modifiable by the user.

* * * * *